Dec. 23, 1924. 1,520,486
W. SODEMANN
AUTOMOBILE ENVELOPE
Filed April 2, 1923
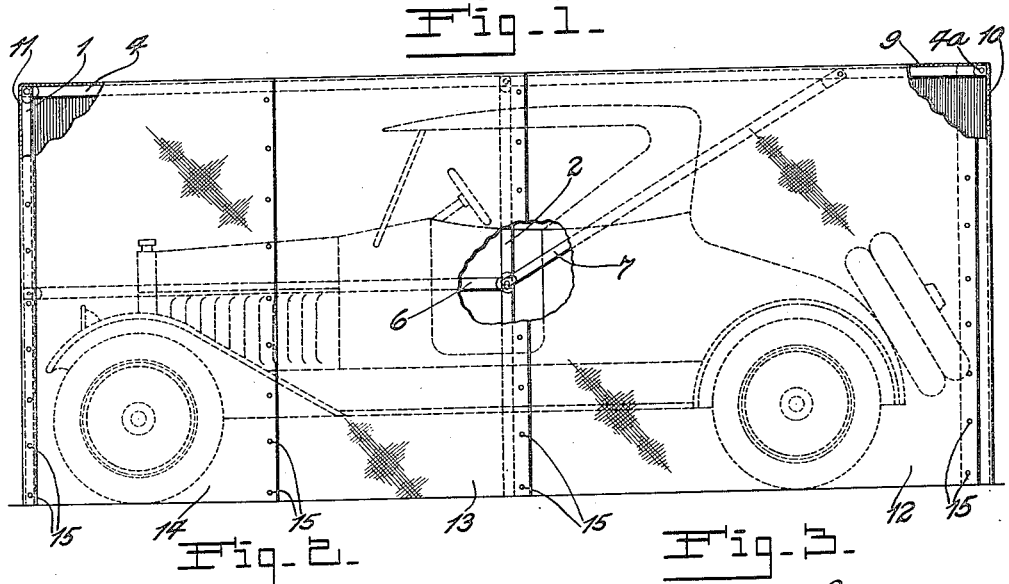
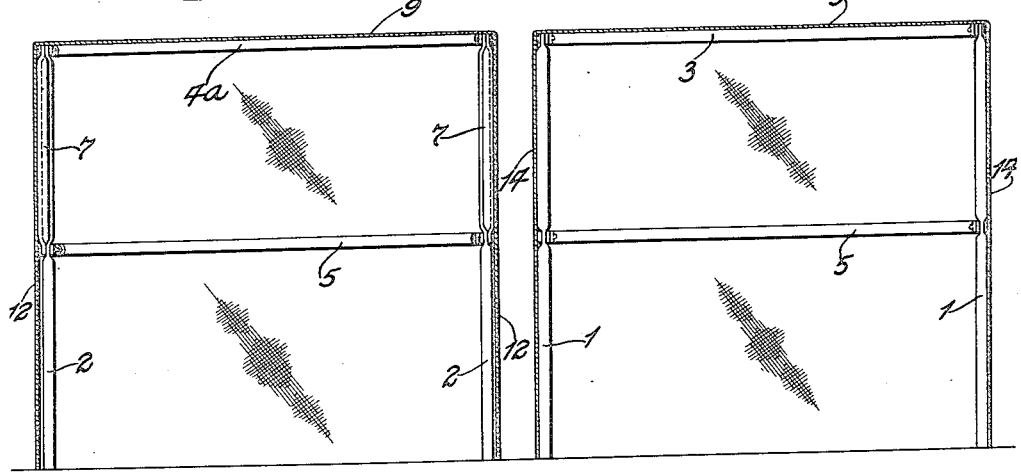
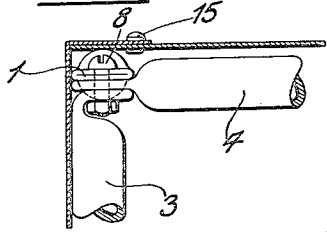
Inventor:
William Sodemann,
by Rippey & Kingsland
His Attorneys.

Patented Dec. 23, 1924.

1,520,486

UNITED STATES PATENT OFFICE.

WILLIAM SODEMANN, OF ST. LOUIS, MISSOURI.

AUTOMOBILE ENVELOPE.

Application filed April 2, 1923. Serial No. 629,374.

*To all whom it may concern:*

Be it known that I, WILLIAM SODEMANN, a citizen of the United States, residing at St. Louis, Missouri, have invented a new and useful Automobile Envelope, of which the following is a specification.

This invention relates to an envelope for an automobile designed and adapted as an enclosure for an automobile within a garage, or elsewhere, to keep the automobile clean and warmer than otherwise would be the case.

An object of the invention is to provide an envelope for closely enclosing an automobile within a garage, or elsewhere, to retain the heat of the engine in cold weather and at all times to protect the vehicle from dust and the like.

Another object of the invention is to provide an improved envelope of the character mentioned comprising a frame and top and side walls forming an enclosure, and the side walls being composed of separate sections of cloth overlapping at their adjacent edges and provided with releasable means for securing the sections together and permitting them to be detached so that one or more of the sections may be raised to pemit access to any part of the automobile.

Another object of the invention is to provide an envelope for closely enclosing an automobile comprising a supporting frame having a projecting end portion, a cover and side curtains for the frame constructed and arranged so that the curtains at one end may be raised to permit the automobile to pass into the enclosure either on a straight line or on a curve without contacting with or moving the frame.

Other objects will appear from the following description reference being made to the drawing in which—

Fig. 1 is a side elevation of my improved envelope with parts of the curtains or panels removed to disclose the frame construction.

Fig. 2 is an end elevation with the curtain at the entrance end removed.

Fig. 3 is a view from the opposite end showing the end curtain removed.

Fig. 4 is a sectional view showing certain preferred but optional details of the invention.

The invention as shown comprises a frame composed of supporting uprights 1 for one end of the device, uprights 2 approximately midway of the length of the device, cross connections 3 at the top connecting the uprights 1 and 2. respectively, longitudinal top frame members 4 connecting the upper ends of the uprights 1 with the upper ends of the uprights 2 and extending relatively a considerable distance beyond the uprights 2, a cross connection 4ª connecting the projecting ends of the longitudinal members 4, a cross connection 5 connecting the end uprights 1, longitudinal connections 6 connecting the uprights 1 with the uprights 2, and inclined supports 7 having their lower ends connected to the uprights 2 and their upper ends conected to the longitudinal frame members 4 about midway between the uprights 2 and the ends of said members 4. This frame may be composed of any appropriate material and, as shown, is made of tubing, though I do not restrict myself to the use of tubing in making the frame. The frame is preferably detachable and. the adjacent portions of the tubing are pressed flat, as clearly shown in Fig. 4, and have bolts 8 passing therethrough to secure the parts together. The bolts 8 are removable so that the frame may easily be removable or taken apart.

The entrance end of the frame is the end opposite from the uprights 2, there being no uprights near the entrance end, so that an automobile may be driven into the frame either in a straight line or on a curve without contact with any portion of the frame, even though the upright portions of the frame are close to the automobile when the latter is in the enclosure.

The enclosure supported by the frame is composed of a suitable fabric characterized essentially by flexibility for which purpose canvas is appropriate. As shown, the enclosure comprises a cover or top wall 9 supported upon and extending the full length of the upper frame members 4 and at the entrance end provided with a downwardly extended portion 10 which may be raised and placed upon the cover or top wall to permit the automobile to be driven in or out and which may be easily lowered to form an end enclosing wall when the automobile is within the enclosure. At the opposite end the cover or top wall is provided with an extended portion 11 which extends downardly to the floor as does the curtain or extended portion 10.

The side walls of the enclosure are composed of separate sections or curtains of which the section or curtain 12 forms a panel extending from the side edges of the end curtain 10 to the uprights 2; the section or curtain 13 forms a panel overlapping the adjacent edge of the panel 12 and extending about half way to the opposite end of the frame; the section or curtain 14 forms a panel overlapping the adjacent edge of the panel 12 and the vertical side edges of the end curtain 11. The overlapping edges of the panels 10 and 12; the overlapping edges of the panels 13 and 14, and the overlapping edges of the panels 11 and 14 are detachably connected by snap fasteners 15 so that when it is desired to raise any of the panels for any purpose it is only necessary to release the snap fasteners 15, which are of familiar construction, and raise the disconnected panel.

For instance, when it is desired to drive the automobile into or out of the envelope it is necessary to raise the end panel 10 and perhaps the two adjacent side panels 12. In such case it is only necessary to release the snap fasteners 15 connecting the panels 10 and 12 and the snap fasteners 15 connecting the panels 12 and 13. The disconnected panels 10 and 12 may then be thrown upon the top 9 of the envelope leaving an open end of the envelope through which the automobile may be driven into or out of the enclosure.

If it is desired to gain access to the engine or to the intermediate portion of the automobile while it is within the envelope it is only necessary to disconnect the proper side panel or the end panel 11 by releasing the snap fasteners 15 and raising the disconnected panel to permit the desired access.

All of the curtains or panels extend to the floor and are close to the sides and ends of the automobile within the envelope forming a small enclosure that not only protects the automobile from dust and the like, but also keeps the automobile warmer and thereby facilitates the starting of the engine even in cold weather.

From the foregoing it will be seen that my invention is a genuine convenience because it obtains all of its intended objects and purposes in a highly efficient and convenient manner, and is of economical construction. The device may be easily set up or taken down and access may be obtained to any part of the automobile within the envelope without inconvenience. The construction permitting the automobile to be driven into or from the close confining envelope without disturbing any portion of the frame is an important feature of the invention.

I am aware that the invention may be varied in numerous particulars without departure from the nature and principle thereof. I do not restrict myself unessentially, but what I claim and desire to secure by Letters Patent is:—

1. An envelope for closely confining an automobile, comprising a frame composed of two side series of supporting uprights, and a horizontal top supporting member attached to the upper ends of the series of uprights at each side and extending relatively a considerable distance beyond them in one direction; a top supported by the top supporting members; end curtains extending downwardly from the ends of the top to the floor; and a number of side panels extending downwardly from the top to the floor and having their adjacent vertical edges overlapping.

2. A device of the character described, comprising a frame composed of supporting end uprights, additional supporting uprights spaced from each end upright, top-supporting members connecting the upper ends of the supporting end uprights and with the additional uprights and extending relatively a considerable distance beyond the additional uprights in one direction, braces connecting the supporting uprights with each other, and braces connecting the additional supporting uprights with the top supporting members; in combination with a top supported by and extending the full length of the supporting members; extensions in connection with the top extending downwardly at the ends of the top supporting members to the floor; and a number of side panels in connection with the top extending downwardly at the sides of the top supporting members to the floor.

3. A device of the character described. comprising a frame composed of a pair of supporting uprights at each side of the device, top supporting members connecting the upper ends of the supporting uprights and extending relatively a considerable distance beyond them in one direction, braces connecting the supporting uprights with each other, and braces connecting the two adjacent supporting uprights with the extended portions of the top supporting members; in combination with a top supported by and extending the full length of the top supporting members; extensions in connection with the top extending downwardly at the ends of the top supporting members to the floor; a number of side panels in connection with the top extending downwardly at the sides of the top supporting members to the floor, the adjacent edges of the side panels overlapping each other and also overlapping the edges of the extensions of the top at the end; and releasable devices for connecting said overlapping edges.

WILLIAM SODEMANN.